(12) United States Patent
Falk et al.

(10) Patent No.: US 12,132,220 B2
(45) Date of Patent: Oct. 29, 2024

(54) BATTERY MODULE

(71) Applicant: Dr. Ing. h.c. F. Porsche Aktiengesellschaft, Stuttgart (DE)

(72) Inventors: Max Falk, Wiesloch (DE); Philipp Kellner, Renningen (DE); Christopher Volkmer, Niefern-Öschelbronn (DE); Sascha Mostofi, Zeltingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 18 days.

(21) Appl. No.: 17/690,145

(22) Filed: Mar. 9, 2022

(65) Prior Publication Data
US 2022/0294068 A1 Sep. 15, 2022

(30) Foreign Application Priority Data
Mar. 10, 2021 (DE) ...................... 10 2021 105 833.3

(51) Int. Cl.
*H01M 10/00* (2006.01)
*H01M 10/48* (2006.01)
(Continued)

(52) U.S. Cl.
CPC ....... *H01M 50/289* (2021.01); *H01M 10/482* (2013.01); *H01M 10/486* (2013.01);
(Continued)

(58) Field of Classification Search
CPC ............. H01M 50/289; H01M 10/482; H01M 10/486; H01M 50/209; H01M 10/0481;
(Continued)

(56) References Cited

U.S. PATENT DOCUMENTS 9,178,196 B2 11/2015 Srinivasan et al.
10,608,292 B2 * 3/2020 Yang .................. H01M 10/482
(Continued)

FOREIGN PATENT DOCUMENTS

CN 109994798 A 7/2019
CN 209843807 U 12/2019
(Continued)

OTHER PUBLICATIONS

Great Britain Search Report for GB Application No. 2203132.2, dated Aug. 5, 2022, 1 page.
(Continued)

*Primary Examiner* — Nicholas P D'Aniello
(74) *Attorney, Agent, or Firm* — Buchanan Ingersoll & Rooney PC

(57) ABSTRACT

A battery module includes a battery module housing and a battery cell package, which has a plurality of battery cells and is arranged in the battery module housing. The battery cell package is supported on an inner face of the battery module housing at least by way of an outer face. A battery cell monitoring unit is connected to the battery cells via a signal line. A protective plate is arranged on the outer face of the battery cell package that is supported on the inner face of the battery module housing. A recess is provided on the side of the protective plate facing toward or facing away from the battery cell package, in which recess at least one portion of the signal line is arranged.

17 Claims, 2 Drawing Sheets

(51) Int. Cl.
  *H01M 50/204* (2021.01)
  *H01M 50/209* (2021.01)
  *H01M 50/289* (2021.01)
  *H01M 50/291* (2021.01)
  *H01M 50/569* (2021.01)

(52) U.S. Cl.
  CPC ....... *H01M 50/204* (2021.01); *H01M 50/209* (2021.01); *H01M 50/291* (2021.01); *H01M 50/569* (2021.01)

(58) Field of Classification Search
  CPC ............. H01M 50/204; H01M 50/249; H01M 50/284; H01M 50/569; H01M 50/258; H01M 10/48; H01M 50/242; H01M 50/244; H01M 50/291; H01M 50/293; Y02E 60/10; B60L 50/64
  See application file for complete search history.

(56) References Cited

U.S. PATENT DOCUMENTS

| | | | |
|---|---|---|---|
| 2007/0238018 A1* | 10/2007 | Lee | H01M 50/271 361/736 |
| 2011/0104533 A1 | 5/2011 | Seto | |
| 2015/0357682 A1 | 12/2015 | Farha et al. | |
| 2016/0049703 A1* | 2/2016 | Lobert | H01M 10/486 429/62 |
| 2019/0198952 A1 | 6/2019 | Choi et al. | |
| 2020/0411924 A1* | 12/2020 | Yun | H01M 50/293 |

FOREIGN PATENT DOCUMENTS

| | | |
|---|---|---|
| CN | 110911595 A | 3/2020 |
| DE | 102012223090 A1 | 6/2013 |
| DE | 102018133391 A1 | 6/2019 |
| EP | 2317584 A1 | 5/2011 |
| JP | 2011096507 A | 5/2011 |
| JP | 2017152306 A | 8/2017 |
| JP | 2020004680 A | 1/2020 |
| KR | 20200078450 A | 7/2020 |
| WO | 2020175201 A1 | 9/2020 |

OTHER PUBLICATIONS

English Translation of the Japanese Notice of Reasons for Refusal for Japanese Application No. 2022-034912, dated Apr. 5, 2023, 2 pages.

English translation Office Action (First Office Action) issued Dec. 8, 2023, by the National Intellectual Property Administration, P. R. China in corresponding Chinese Patent Application No. 202210222993.1. (8 pages).

* cited by examiner

BATTERY MODULE

CROSS-REFERENCE TO RELATED APPLICATION

This application claims priority to German Patent Application No. 10 2021 105 833.3, filed Mar. 10, 2021, the content of such application being incorporated by reference herein in its entirety.

FIELD OF THE INVENTION

The invention relates to a battery module, comprising a battery module housing, a battery cell package, which comprises a plurality of battery cells and is arranged in the battery module housing, wherein the battery cell package is supported on an inner face of the battery module housing at least by way of an outer face, and a battery cell monitoring unit, which is connected to the battery cells via a signal line.

BACKGROUND OF THE INVENTION

The prior art discloses battery modules that comprise a battery module housing and a plurality of battery cells, in particular pouch cells, which are electrically interconnected with one another. The battery cells are arranged in the form of a battery cell package within the battery module housing and are usually connected to a battery cell monitoring unit via a signal line, the battery cell monitoring unit being used to monitor the battery cells during operation, that is to say during the charging and discharge process, and to thereby identify faulty operation of the battery cells at an early stage.

The battery cells are usually braced by appropriate means in order to form a battery cell package before they are inserted into the battery module housing. In the state in which the battery cell package is inserted, said battery cell package bears against an inner face of the battery module housing by way of an outer face, wherein the signal line is arranged on the outer face of the battery cell package. An arrangement of the signal line on an outer face that adjoins a cooling device is not desired because the signal line would negatively affect the cooling of the battery cell package.

During operation of the battery module, the battery cells can expand, which results in increased compression of the outer face of the battery cell package on the inner face of the battery module housing. The signal line arranged on the outer face of the battery cell package constitutes an unevenness, wherein the bearing or the pressing of the battery cells against such unevennesses leads to accelerated aging of the battery cells.

It is noted that the statements in the background section are not necessarily admissions that of prior art.

SUMMARY OF THE INVENTION

Described herein is a battery module in which the signal line can be arranged on the battery cell package in a simple and cost-effective manner, wherein the aim is to prevent the cooling effect or the aging of the battery cells being influenced by the arrangement of the signal line.

As a result of the fact that a protective plate is arranged on the outer face of the battery cell package being supported on the inner face of the battery module, a recess being provided on the side of said protective plate facing toward or facing away from the battery cell package, in which recess at least one portion of the signal line is arranged, the signal line can be placed on the battery cell package without producing an unevenness in the process and thus without accelerating the aging of the battery cells that bear against the inner face of the battery module housing by way of the protective plate. The protective plate and the signal line arranged in the recess together form a flat face, as a result of which the battery cell package bears extensively against the inner face of the battery module housing when one or more battery cells expand. Furthermore, the signal line is arranged on an outer face, on which there is no cooling device, that is to say no cooling plate, arranged, as a result of which the cooling of the battery cell package is not adversely affected by the signal line and as a result reliable cooling of the battery cell package can be ensured.

In one preferred configuration, at least one temperature sensor, which is connected to the battery cell monitoring unit via the signal line, is provided. The signal line comprises a first signal line for coupling the battery cells to the battery cell monitoring unit and a second signal line for coupling the temperature sensor to the battery cell monitoring unit. The temperature of the battery cells can be detected and overheating of the battery cells can be prevented by the at least one temperature sensor. As a result, burning of the battery cell and of the battery module can be prevented. A plurality of temperature sensors are preferably provided, wherein in particular each battery cell is assigned a respective temperature sensor.

At least one voltage detection element for detecting the voltage of at least one battery cell is preferably provided, wherein the voltage detection element is connected to the battery cell monitoring unit via the signal line. As a result, the voltage of a battery cell can be detected and monitored, as a result of which for example a malfunction of the battery cell can be identified at an early stage.

The signal line is preferably configured as an FPC connector. The FPC (flexible printed circuit) connector is a flexible printed circuit board, which are usually printed circuits constructed on a flexible plastic carrier, for example made of polyimide, Mylar, nylon or polyester. The conductor material is usually produced from copper or silver. The FPC connectors have a relatively low weight, a small thickness, a high mechanical strength, a resistance to high temperatures and a good electromagnetic immunity (EMI).

The protective plate preferably has a flat inner side and at least one spacer element arranged on the flat inner side. As a result, the protective plate comprising the recess required for the signal line can be easily produced. In this case, at least one rectangular spacer element with a constant wall thickness and of a relatively simple construction is secured to a plate-like element that is likewise relatively easy to produce and has a constant wall thickness. In the case of a single spacer element, the recess is arranged at the edge of the protective plate.

The spacer element preferably has a height, that is to say a wall thickness, corresponding to the height of the signal line. As a result, the face of the spacer element facing toward the battery cell package and of the signal line is arranged in a common plane, as a result of which an unevenness and as a result accelerated aging due to an unevenness can be reliably prevented.

In one preferred configuration, the spacer element is formed by a lacquer applied to the inner side or by an adhesive strip adhesively bonded to the inner side. As a result, the spacer element can be produced in a particularly simple manner.

In one preferred configuration, the protective plate has a flat inner side and at least two spacer elements arranged on the flat inner side and in parallel with one another, wherein the spacer elements are arranged on the flat inner side in a manner spaced apart such that the recess is formed between the two spacer elements. As a result, the protective plate comprising the recess required for the signal line can be easily produced. In this case, two rectangular spacer elements with a constant wall thickness and of a relatively simple construction are secured to a plate-like element that is likewise relatively easy to produce and has a constant wall thickness. The spacer elements are preferably adhesively bonded or injection molded.

The protective plate is preferably of plate-like form and has a flat inner side on which a groove forming the recess is formed. As a result, the protective plate can be configured in one part, as a result of which the assembly outlay of the battery module is simplified. In one preferred configuration, the groove has a depth corresponding to the height of the signal line. As a result, the faces of the spacer elements facing toward the battery cell package and of the signal line are arranged in a common plane, as a result of which an unevenness and as a result accelerated aging due to the unevenness can be prevented.

In one preferred configuration, a compression insert is arranged between the protective plate and the battery cell package. Owing to the compression insert, particularly small and remaining unevennesses can be compensated for, as a result of which the risk of accelerated aging is again reduced.

Such a battery module makes it possible to place the signal line on the battery cell package without producing an unevenness in the process and thus without accelerating the aging of the battery cells, which bear against the inner face of the battery module housing by means of the protective plate, or negatively influencing the cooling effect of a cooling device.

BRIEF DESCRIPTION OF THE DRAWINGS

Two exemplary embodiments of the invention are explained in more detail with reference to the drawings.

DETAILED DESCRIPTION OF THE INVENTION

Figure 1:
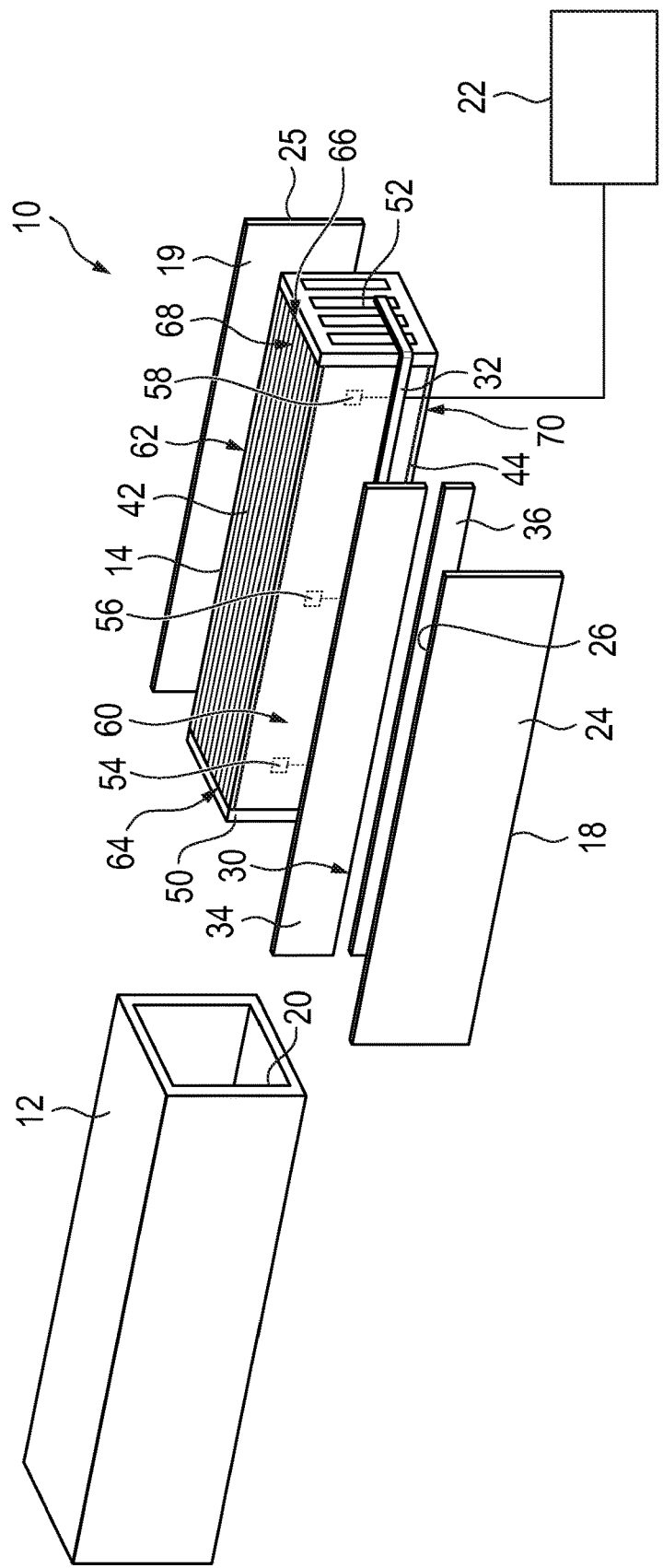
FIG. 1 shows a battery module in an exploded illustration.

FIG. 1 shows a battery module 10 of a traction battery of an electric vehicle. The traction battery usually comprises a plurality of such battery modules 10, which are interconnected with one another to form the traction battery and together supply electrical energy to an electric drive unit of the electric vehicle.

The battery module 10 comprises a battery module housing 12, which is produced for example from an aluminum extruded profile. The battery module housing 12 has two open end faces, wherein, during assembly of the battery module 10, a battery cell package 14 is inserted into the battery module housing 12 at least through one of the two end faces. The battery cell package 14 comprises a plurality of battery cells 16, which are joined together to form a battery cell stack and form the battery cell package 14. The battery cell package 14 comprises a plurality of outer faces 60, 62, 64, 66, 68, 70, specifically two side faces 60, 62, a top face 68, a bottom face 70 and two end faces 64, 66. A respective end plate 50, 52 is arranged on the end faces 64, 66, which end plates fully close the open end sides of the battery module housing 12 when the battery cell package 14 is in the fully assembled state, wherein the end plates 50, 52 bear against the circumferential inner face of the battery module housing 12 in a sealing manner by way of their outer circumferential face.

On its top face 68 and on its bottom face 70, the battery cell package 14 has a respective cooling plate 42, 44, which cooling plates fully bear against the top face 68 and the bottom face 70 of the battery module housing 12 and cool the battery cells 16 during operation, that is to say during the discharge and charging process. The cooling plates 42, 44 are fluidically connected to a coolant circuit, which is not shown in the FIG. In order to monitor the temperature of the battery cells 16, a signal line 32 is arranged on the end faces 64, 66 and the side face 60, said signal line being configured as an FPC connector and connecting each individual battery cell 16 to a battery cell monitoring unit 22. Furthermore, a plurality of temperature sensors 54, 56, which are illustrated schematically in FIG. 1 and which detect the temperature of the battery cells 16, and a voltage detection element 58 for tapping a voltage of a battery cell 16 are connected to the battery cell monitoring unit 22 via the signal line 32. The battery cell monitoring unit 22 is used to ensure safe operation of the battery module 10, wherein in particular burning of the battery module 10 is intended to be prevented.

The battery cell package 14 furthermore has a respective protective plate 18, 19 on its end faces 60, 62, which protective plates are secured to the end of the end plates 50, 52 and protect the battery cells 16 or the battery cell package 14 from damage for example upon insertion into the battery module housing 12. In the final assembled state of the battery module 10, that is to say when a battery cell package 14 has been inserted into the battery module housing 12, the battery cell package 14 bears against the inner face 20 of the battery module housing 12 by way of the protective plates 18, 19. In this case, the protective plates 18, 19 bear against the inner face 20 of the battery module housing 12 by way of the whole of their outer face 24, 25.

In accordance with aspects of the invention, the protective plate 18 has a recess 30 on its inner face 26, in which recess the signal line 32 is arranged or through which recess the signal line 32 runs. In the final assembled state, the signal line 32 is also able to move in the longitudinal direction and can also expand or contract on account of temperature fluctuations.

Figure 2:
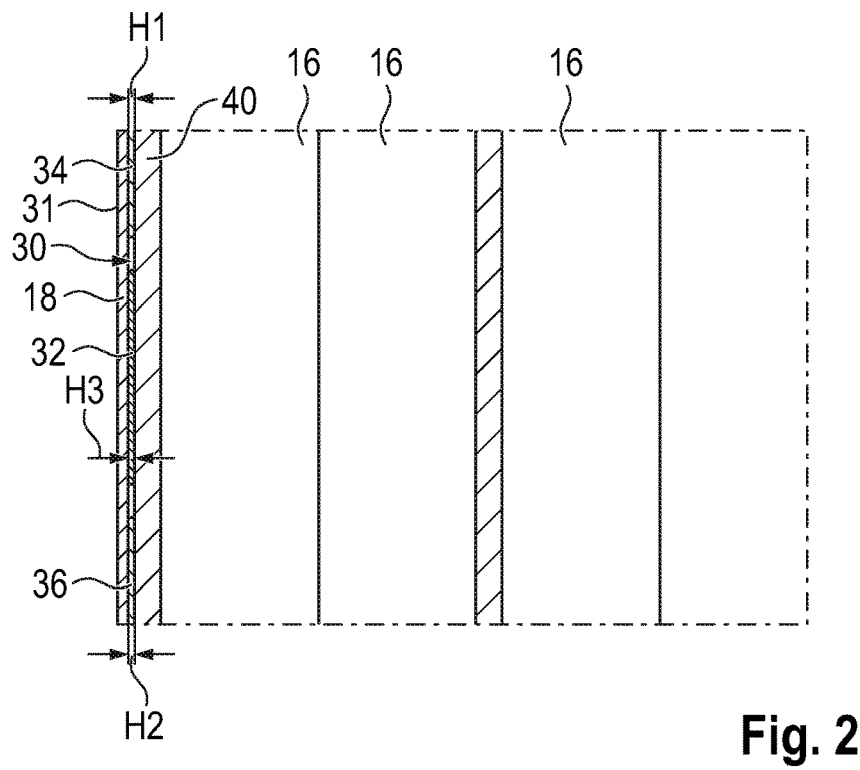
FIG. 2 shows a cross section of the battery module from FIG. 1 comprising a first configuration of a protective plate.

FIG. 2 shows a first configuration of the protective plate 18 comprising the recess 30. The protective plate 18 has a plate-like element 31, to the inner face of which two spacer elements 34, 36 are secured. The spacer elements 34, 36 are arranged spaced apart from one another in such a way that the space between the two spacer elements 34, 36 forms the recess 30. The signal line 32 is arranged in the recess 30, wherein the recess 30 is configured to be slightly wider than the signal line 32. The heights H1, H2 of the spacer elements 34, 36 correspond to the height H3 of the signal line 32.

The spacer elements 34, 36 can be configured as plate-like elements that are secured to the inner face of the plate-like element 31, as adhesive strips or as a lacquer applied to the inner face of the plate-like element 31.

Figure 3:
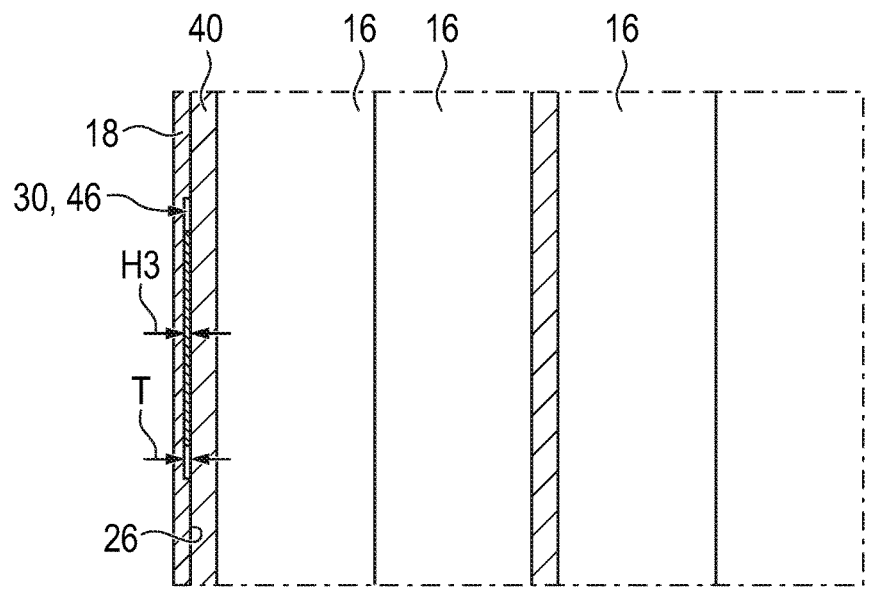
FIG. 3 shows a cross section of the battery module from FIG. 1 comprising a second configuration of a protective plate.

FIG. 3 shows a second configuration of the protective plate 18, wherein the protective plate 18 has a greater wall thickness and the recess 30 is formed by a groove 46 formed on the inner face 26 of the protective plate 18. The depth of the groove 46 corresponds to the height H3 of the signal line 32.

During operation of the battery module 10, the battery cells 16 can expand, which results in increased compression between the outer faces 60, 62, 64, 66, 68, 70 of the battery cell package 14 and the inner face 20 of the battery module housing 12. Each unevenness that presses into one of the battery cells 16 in particular due to the expansion of the battery cells 16 causes acceleration of the aging of the battery cells 16. As a result of the fact that the signal line 32, which would form such an unevenness, is arranged in a recess 30 formed on the protective plate 18, the signal line 32 can be placed on the battery cell package 14 without producing an unevenness in the process and thus without accelerating the aging of the battery cells 16. In addition, a compression insert 40 is arranged between the protective plate 18 and the battery cell package 14, said compression insert also being able to be used to compensate for particularly small unevennesses and again being used to reduce the risk of accelerated aging of the battery cells 16.

Other structural embodiments than the embodiments described are also possible and fall within the scope of protection.

What is claimed is:

1. A battery module comprising:
a battery module housing,
a battery cell package, which comprises a plurality of battery cells, arranged in the battery module housing, wherein a vertically oriented outer face of the battery cell package is arranged to face an inner face of a wall of the battery module housing,
a battery cell monitoring unit connected to the battery cells via a signal line,
a protective plate arranged between the outer face of the battery cell package and the inner face of the battery module housing, wherein the protective plate covers the vertically oriented outer face of the battery cell package, and
a recess disposed on a side of said protective plate that either faces toward or away from the battery cell package, in which recess at least one portion of the signal line is arranged,
wherein each of the plurality of battery cells, the at least one portion of the signal line, the protective plate and the inner face of the battery module housing are all arranged vertically and parallel to one another in a stacked formation,
wherein each of the plurality of battery cells, the protective plate and the wall of the battery module housing has a substantially rectangular shape having a length dimension, a height dimension measured between top and bottom edges that is less than the length dimension, and a thickness dimension that is less than the height dimension, wherein the length dimensions are oriented in a same direction, and whereby the at least one portion of the signal line extends horizontally along the length dimension of the protective plate at a vertical location between the top and bottom edges of the protective plate.

2. The battery module as claimed in claim 1, further comprising at least one temperature sensor connected to the battery cell monitoring unit via the signal line.

3. The battery module as claimed in claim 1, further comprising at least one voltage detection element for detecting the voltage of at least one battery cell of the plurality of battery cells, wherein the voltage detection element is connected to the battery cell monitoring unit via the signal line.

4. The battery module as claimed in claim 1, wherein the signal line is a flexible printed circuit (FPC) connector.

5. The battery module as claimed in claim 1, further comprising a compression insert arranged between the protective plate and the battery cell package.

6. The battery module as claimed in claim 5, wherein the compression insert is sandwiched between the signal line and one battery cell of the plurality of battery cells.

7. The battery module as claimed in claim 1, further comprising a second protective plate positioned on a side of the battery cell package that is opposite said outer face, wherein the second protective plate is arranged parallel to the protective plate.

8. A battery module comprising:
a battery module housing,
a battery cell package, which comprises a plurality of battery cells, arranged in the battery module housing, wherein a vertically oriented outer face of the battery cell package is arranged to face an inner face of a wall of the battery module housing,
a battery cell monitoring unit connected to the battery cells via a signal line,
a protective plate arranged between the outer face of the battery cell package and the inner face of the battery module housing, wherein the protective plate covers the vertically oriented outer face of the battery cell package, and
a recess disposed on a side of said protective plate that either faces toward or away from the battery cell package, in which recess at least one portion of the signal line is arranged,
wherein the protective plate has (i) a flat inner side facing the outer face of the battery cell package and (ii) at least one spacer element arranged on the flat inner side, wherein the recess is formed between the flat inner side of the protective plate and the outer face of the battery cell package,
wherein each of the plurality of battery cells, the spacer element, the at least one portion of the signal line, the protective plate and the inner face of the battery module housing are all arranged vertically and parallel to one another in a stacked formation,
wherein each of the plurality of battery cells, the protective plate and the wall of the battery module housing has a substantially rectangular shape having a length dimension, a height dimension measured between top and bottom edges that is less than the length dimension, and a thickness dimension that is less than the height dimension, wherein the length dimensions are oriented in a same direction, and whereby the at least one portion of the signal line extends horizontally along the length dimension of the protective plate at a vertical location between the top and bottom edges of the protective plate.

9. The battery module as claimed in claim 8, wherein the spacer element has a thickness (H1, H2) corresponding to a thickness (H3) of the signal line.

10. The battery module as claimed in claim 8, wherein the spacer element is formed by a lacquer applied to the flat inner side or by an adhesive strip adhesively bonded to the flat inner side.

11. The battery module as claimed in claim 8, wherein the protective plate has at least two spacer elements arranged on the flat inner side and in parallel with one another, wherein the spacer elements are spaced apart on the flat inner side such that the recess is formed between the two spacer elements.

12. The battery module as claimed in claim 8, further comprising a compression insert arranged between the protective plate and the battery cell package, wherein the compression insert is sandwiched between the signal line and one battery cell of the plurality of battery cells.

13. The battery module as claimed in claim 8, further comprising a second protective plate positioned on a side of the battery cell package that is opposite said outer face, wherein the second protective plate is arranged parallel to the protective plate.

14. A battery module comprising:
- a battery module housing,
- a battery cell package, which comprises a plurality of battery cells, arranged in the battery module housing, wherein a vertically oriented outer face of the battery cell package is arranged to face an inner face of a wall of the battery module housing,
- a battery cell monitoring unit connected to the battery cells via a signal line,
- a protective plate arranged between the outer face of the battery cell package and the inner face of the battery module housing, wherein the protective plate covers the vertically oriented outer face of the battery cell package, and
- a recess disposed on a side of said protective plate that either faces toward or away from the battery cell package, in which recess at least one portion of the signal line is arranged,
- wherein the protective plate has a flat inner side, which faces the outer face of the battery cell package, and on which a groove forming the recess is formed,
- wherein each of the plurality of battery cells, the at least one portion of the signal line, the protective plate and the inner face of the battery module housing are all arranged vertically and parallel to one another in a stacked formation,
- wherein each of the plurality of battery cells, the protective plate and the wall of the battery module housing has a substantially rectangular shape having a length dimension, a height dimension measured between top and bottom edges that is less than the length dimension, and a thickness dimension that is less than the height dimension, wherein the length dimensions are oriented in a same direction, and whereby the at least one portion of the signal line extends horizontally along the length dimension of the protective plate at a vertical location between the top and bottom edges of the protective plate.

15. The battery module as claimed in claim 14, wherein the groove has a depth (T) corresponding to a thickness (H3) of the signal line.

16. The battery module as claimed in claim 14, further comprising a compression insert arranged between the protective plate and the battery cell package, wherein the compression insert is sandwiched between the signal line and one battery cell of the plurality of battery cells.

17. The battery module as claimed in claim 14, further comprising a second protective plate positioned on a side of the battery cell package that is opposite said outer face, wherein the second protective plate is arranged parallel to the protective plate.

* * * * *